(12) United States Patent
Von Aswege

(10) Patent No.: US 11,598,310 B2
(45) Date of Patent: Mar. 7, 2023

(54) METHOD FOR CONTROLLING A WIND TURBINE, WIND TURBINE, AND WIND PARK

(71) Applicant: WOBBEN PROPERTIES GMBH, Aurich (DE)

(72) Inventor: Enno Von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/734,875

(22) PCT Filed: Jun. 4, 2019

(86) PCT No.: PCT/EP2019/064511
§ 371 (c)(1),
(2) Date: Dec. 3, 2020

(87) PCT Pub. No.: WO2019/234035
PCT Pub. Date: Dec. 12, 2019

(65) Prior Publication Data
US 2021/0239092 A1 Aug. 5, 2021

(30) Foreign Application Priority Data
Jun. 8, 2018 (DE) .................... 10 2018 113 705.2

(51) Int. Cl.
*F03D 7/02* (2006.01)
(52) U.S. Cl.
CPC ......... *F03D 7/0224* (2013.01); *F03D 7/0204* (2013.01); *F03D 7/0276* (2013.01);
(Continued)

(58) Field of Classification Search
CPC .... F03D 7/0204; F03D 7/0224; F03D 7/0296; F03D 7/076; F05B 2270/331;
(Continued)

(56) References Cited

U.S. PATENT DOCUMENTS 8,085,487 B1 * 12/2011 Jung ................... G11B 5/59633
360/48
8,123,477 B2 * 2/2012 Risager ................. F03D 7/0264
416/41
(Continued)

FOREIGN PATENT DOCUMENTS

| | | |
|---|---|---|
| CN | 106194580 A | 12/2016 |
| EP | 2746576 A2 | 6/2014 |

(Continued)

*Primary Examiner* — Igor Kershteyn
(74) *Attorney, Agent, or Firm* — Seed Intellectual Property Law Group LLP

(57) ABSTRACT

A method for operating a wind turbine, an associated wind turbine, and an associated wind park are provided. The wind turbine has a tower with tower loads acting thereon and an aerodynamic rotor which generates a rotor thrust. The method has a step of reducing the rotor thrust. The reduction of the rotor thrust is performed while considering the effect of the reduction of the rotor thrust on the tower loads. Thus, the reduction of the rotor thrust is avoided in cases which result in undesirable or even counter-productive effects on the tower loads.

14 Claims, 2 Drawing Sheets

(52) U.S. Cl.
CPC ... *F05B 2270/327* (2013.01); *F05B 2270/328* (2013.01); *F05B 2270/331* (2013.01)

(58) Field of Classification Search
CPC .......... F05B 2270/334; F05B 2270/328; F05B 2270/327; F05B 2270/807
See application file for complete search history.

(56) References Cited

U.S. PATENT DOCUMENTS

| | | | |
|---|---|---|---|
| 9,355,680 B1* | 5/2016 | Jin | H03M 13/1102 |
| 9,548,070 B1* | 1/2017 | Chatradhi | G06N 7/005 |
| 2011/0187107 A1* | 8/2011 | Toyohara | F03D 7/0248 |
| | | | 290/44 |
| 2014/0178195 A1* | 6/2014 | Blom | F03D 7/045 |
| | | | 416/37 |
| 2015/0117173 A1* | 4/2015 | Green | G11B 5/455 |
| | | | 369/53.38 |
| 2017/0152835 A1 | 6/2017 | Bønding et al. | |

FOREIGN PATENT DOCUMENTS

| | | |
|---|---|---|
| EP | 2876300 A1 | 5/2015 |
| EP | 2 963 283 A1 | 1/2016 |
| WO | 2016/138647 A1 | 9/2016 |

\* cited by examiner

METHOD FOR CONTROLLING A WIND TURBINE, WIND TURBINE, AND WIND PARK

BACKGROUND

Technical Field

The present invention concerns a method for operating a wind turbine, an associated wind turbine, and a wind park. The present invention in particular concerns a method for operating a wind turbine having a tower with tower loads acting thereon, and an aerodynamic rotor which produces a rotor thrust. The method for operating a wind turbine in particular comprises a step of reducing the rotor thrust.

Description of the Related Art

In control or operation of wind turbines, it is known that there are environmental and operating states of the wind turbine in which it is useful to quickly feather one or more of the rotor blades of the aerodynamic rotor, i.e., increase the pitch angle of the rotor blades independently of the speed control. This is usually necessary if a mechanical strain, i.e., the load, on the wind turbine must be reduced or overloading is to be avoided. In such extreme situations, for example to avoid extreme loads on the rotor blades, there are protective functions which issue instructions to reduce the rotor thrust, for example to feather or retract the rotor blades. As a result, because of the rapid feathering of the rotor blades, the rotor thrust will decrease abruptly. However, situations are conceivable in which the resulting reduction in rotor thrust is either not necessary for reducing the tower loads or even counter-productive. One of these cases is when the rotor thrust is reduced excessively, which depending on the situation may have negative or even hazardous consequences.

In this context, provided herein is an improved operation of a wind turbine.

In the priority application of the present PCT application, the German Patent and Trademark Office has researched the following prior art: US 2017/0152835 A1 and CN 106 194 580 A.

SUMMARY

Provided is a method of the type cited initially in that the reduction of the rotor thrust is performed while considering the effect of reduction of the rotor thrust on the tower loads.

Accordingly, if for example the controller of the wind turbine conventionally issues an instruction to reduce the rotor thrust, the instruction is not followed in every case but only after assessment. In other words, the actual function designed to protect the installation, namely the reduction in rotor thrust, is not implemented under all circumstances but adapted to the needs of the wind turbine. This may be regarded as a protective function for the protective function.

In particular, by taking into account the effects on the tower loads, a reduction of rotor thrust may be suppressed if for example feathering is counter-productive or unnecessary for the tower loads.

In a preferred embodiment, the consideration of the effect of the reduction of rotor thrust on the tower loads comprises the suppression or attenuation of the reduction of rotor thrust if the reduction of rotor thrust leads to an increase in tower loads.

In particular in the case that the tower is oscillating forward, i.e., in the direction of the wind or in the direction from which the wind is blowing, the rotor thrust exerts a braking force on the oscillating movement of the tower. If the rotor thrust is reduced in this situation, the braking force acting on the tower is also reduced and, accordingly, the tower would oscillate more quickly and further forward than if the rotor thrust were not reduced. Thus in particular in this case, a reduction of rotor thrust would lead to an increase in tower loads. Since this situation is detected and the reduction of rotor thrust suppressed for example, extreme loads acting on the tower can be reduced.

In an extreme situation, the protective function of the wind turbine for example issues an instruction to reduce the rotor thrust. The effects of this protective function may be attenuated or suppressed completely if the reduction of rotor thrust would not be useful or would even be hazardous for other reasons, in particular taking into account the effects on the tower. This, provided is a type of protective function for the protective function, which may prevent an excessively great effect of the intervention of the first protective function. The first protective function is for example a load controller which intervenes when loads on the rotor blades, or a rate of change of blade loads, are too great. It is particularly preferred if the effects on the tower loads are taken into account depending on the power and/or rotation speed.

In a preferred embodiment, the consideration of the effect of the reduction of rotor thrust on the tower loads comprises the suppression or attenuation of the reduction of rotor thrust if the reduction of rotor thrust leads to an unnecessary reduction in loads acting on the tower.

If for example an instruction is issued to reduce the rotor thrust, according to this embodiment it is established whether or not the reduction in rotor thrust is necessary, taking into account the effect on the tower loads. If no extreme loads occur on the tower irrespective of the reduction in rotor thrust, then with respect to the loads, there is no necessity for a reduction. If nonetheless the rotor thrust were reduced, this could lead to an unnecessary output loss. According to this embodiment, in this case the reduction in rotor thrust would be suppressed, so the yield of the wind turbine can be optimized.

In a preferred embodiment, the method furthermore comprises a step of determining the tower loads, wherein the consideration of the effect of the reduction of rotor thrust on the tower loads comprises a comparison of a change in tower loads with a threshold value.

The change in tower loads is preferably determined by direct or indirect measurement. Various processes for determining the tower loads are known to the person skilled in the art. Changes could be regarded as a gradient of tower loads. The direction of change is preferably indicative of a rearward or forward oscillation of the tower. In this way, the actual position of the tower can be established by determination of the tower loads and/or the change in tower loads, and depending on whether or not the change exceeds a threshold value, the rotor thrust may then be reduced or not.

In a preferred embodiment, the consideration of the effect of the reduction of the rotor thrust on the tower loads comprises determination of a tower head speed or a nacelle oscillation speed.

Thus in this embodiment, the tower loads are determined not by direct measurement but indirectly by determination of the tower head speed. The prevailing loads and in particular the effect of reducing the rotor thrust may then be concluded from the tower head speed.

In a preferred embodiment, the tower head speed is determined from the acceleration of the tower head. Accordingly, the tower head speed is not directly determined but is derived via the acceleration acting on the tower head. This can be achieved particularly easily, for example by fitting accelerometers in the tower head or in the region of the nacelle. Simple measurement of acceleration is therefore, by simple reformulation, indicative of the effects to be expected on the tower loads.

The tower head in the present case means the upper 50% of the height of the tower of the wind turbine. Particularly preferably, the tower head refers to the top 20% and in particular the top 10% of the tower. In particular, in the scope of this disclosure, in the context of the load/load change rate, nacelle/tower head speed, this concerns mainly movements of the tower head in the longitudinal direction perpendicular to a height direction of the tower. Quite particularly, the longitudinal movements parallel to the wind direction are relevant.

In a preferred embodiment, the reduction of the rotor thrust is suppressed as long as the tower head speed in the wind direction lies below a predefined threshold value.

This embodiment may avoid the particularly disadvantageous situation wherein, when the tower head speed has a component in the wind direction, reduction of the rotor thrust would amplify the tower flexion towards the front. The predefined threshold value may even be negative, so that even slight oscillation components in the direction against the wind could lead to a reduction in rotor thrust. However, in particular, this embodiment also means that no reduction of rotor thrust is performed in precisely situations in which the tower oscillates forward with high speed.

In a preferred embodiment, the reduction of rotor thrust comprises an increase in pitch angle of at least one rotor blade of the aerodynamic rotor.

Increasing the pitch angle of one or more rotor blades leads directly to a reduction in rotor thrust, as is well known. The rotor blades may undergo the same increase in pitch angle, or the rotor blades may be controlled individually or in groups. Alternatively or additionally, a shape change of one or more of the rotor blades may be controlled, for example by dynamic surface forms or by attachments such as flaps, in order to ensure a reduction in rotor thrust. Other suitable control systems which finally lead to a reduction in rotor thrust may be used in the same way.

In a preferred embodiment, the reduction of rotor thrust comprises an increase in a minimum pitch angle.

It is known that for the minimum pitch angle, a so-called $\alpha_{min}$ control sets a pitch angle present at least on the blade. This guarantees that the pitch angle or angles of the rotor blade or blades is/are not set below a specific pitch angle, which for example leads to excessively high loads on the rotor. Reducing the rotor thrust may then be integrated in the existing $\alpha_{min}$ control or superposed over this in uncomplicated fashion at little cost. This design is distinguished accordingly by a low extra cost for the device and control system.

In a preferred embodiment, the reduction of rotor thrust comprises a lowering of the nominal rotation speed. Lowering the nominal rotation speed may take place as an alternative or in addition to increasing the minimum pitch angle. Further interventions in the controller which finally lead to a reduction in rotor thrust are conceivable.

In a preferred embodiment, the reduction of rotor thrust is performed while considering the effect of reduction of rotor thrust on the tower loads, in that a maximum permitted change of pitch angle of at least one of the rotor blades of the aerodynamic rotor is implemented as a complex function of the tower loads, in particular as a function of a tower head speed.

With the implementation according to this embodiment, a particularly precise control is possible. Although this implementation is more complex than comparison with a threshold value, it may lead to a significantly more efficient control. In particular, the reduction in rotor thrust may be matched particularly precisely to environmental conditions.

The greater the change in pitch angle, the greater the effect on the reduction or increase in rotor thrust. Thus in this embodiment, for a specific tower head speed, a maximum permitted change may be determined, for example the change in pitch angle may not be restricted when the tower head is oscillating rearward, but significantly restricted in a case in which the tower head is moving forward. Here both the rate of change and the amount of change are considered. Only when there is a sufficient absolute change in pitch angle are any significant effects on the load to be expected. The effects on the loads are greater, the more rapid the change, i.e., the greater the rate of change.

According to a further aspect, provided is a wind turbine having a tower with tower loads acting thereon, an aerodynamic rotor which generates a rotor thrust, and a controller. The controller is configured to operate the wind turbine using the method according to at least one of embodiment.

The wind turbine may be designed, in comparison with known wind turbines, for example for lower loads to be expected on the tower, since the control method is configured to avoid extreme loads, e.g., when the tower is oscillating forward. In addition, the wind turbine allows an optimum energy output, since unnecessary reductions in the rotor thrust and the associated power losses are avoided. The wind turbine with its associated advantages may be combined with all the methods described as preferred embodiments.

According to a further aspect, provided is a wind park with a plurality of turbines.

BRIEF DESCRIPTION OF THE SEVERAL VIEWS OF THE DRAWINGS

Further advantages and exemplary embodiments are described below with reference to the appended figures. The drawings show.

DETAILED DESCRIPTION

Figure 1:
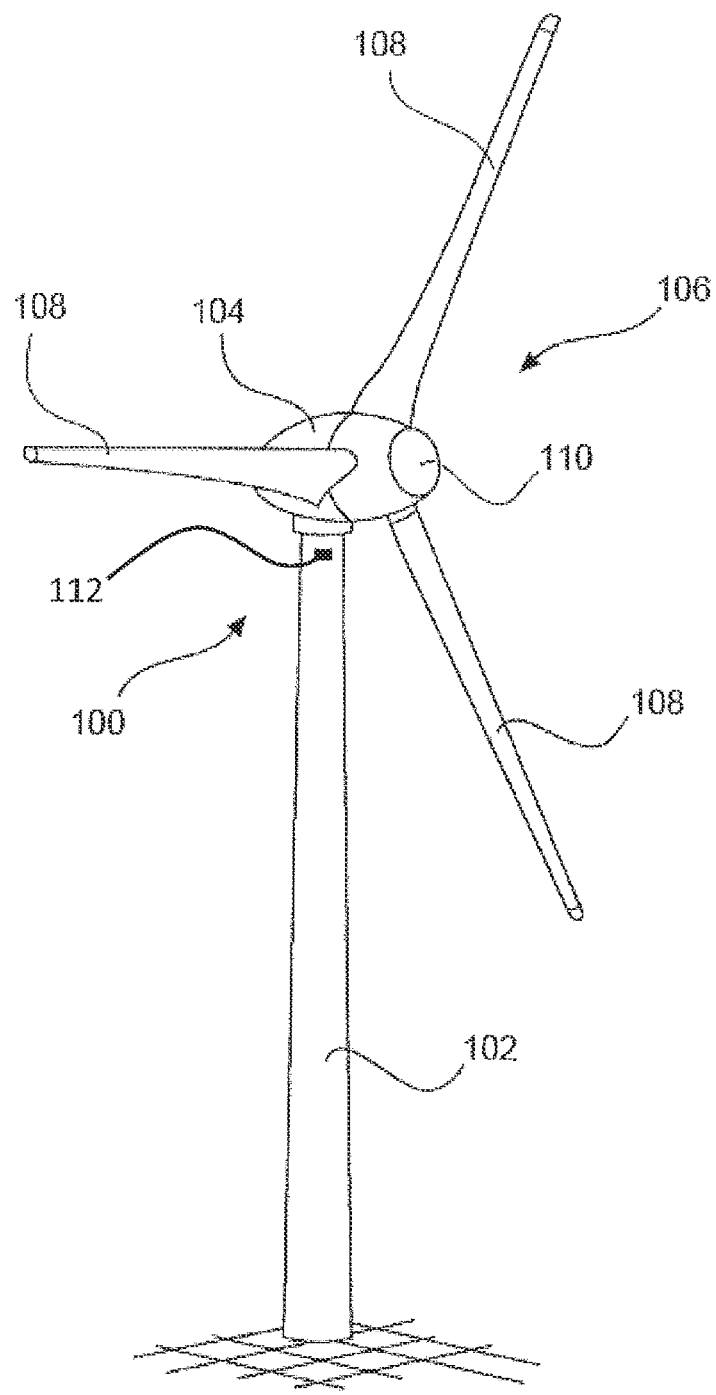
FIG. 1 schematically as an example, a wind turbine.

FIG. 1 shows a diagrammatic depiction of a wind turbine according to the invention. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is set in a rotational movement by the wind during operation of the wind turbine, and thus also turns an electrodynamic rotor of a generator which is coupled directly or indirectly to the aerodynamic rotor 106. The electrical generator is arranged in the nacelle 104 and generates electrical energy. The pitch angle of the rotor blades 108 may be changed by pitch motors at the rotor blade roots of the respective rotor blades 108.

Because of the thrust generated by the aerodynamic rotor 106, in particular the tower 102 is set in oscillation. A main movement direction of the tower oscillation is the direction of the incident wind or the azimuth setting of the nacelle 104. Because of the oscillation of the tower 102, non-negligible loads act on the tower 102. These loads are of decisive significance for the design of the tower 102. The wind turbine may be controlled such that extreme loads on the tower 102 are reduced, whereby the tower 102 may be designed lighter and hence more economically.

In this example, to estimate the loads acting on the tower 102, an acceleration sensor 112 is arranged in the upper region of the tower 102, called the tower head. Alternatively, the acceleration sensor 112 could also be arranged in other regions of the tower 102 or also in the region of the nacelle 104, as long as the acceleration measurements allow conclusions on the acceleration acting on the tower 102. Also, several acceleration sensors 112 may be provided.

The tower loads are determined by means of the acceleration sensors 112 in that the measured acceleration values give the speed of the tower head, and hence a position within the periodic oscillation, and from this the loads acting on the tower 102 may be determined or estimated.

Figure 2:
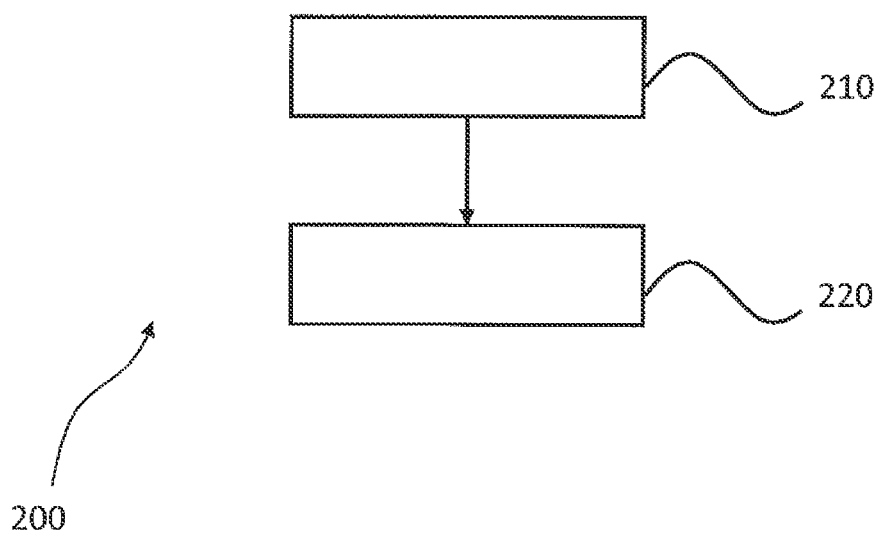
FIG. 2 schematically as an example, the development of a method according to the invention for operating a wind turbine.

The method 200 for operating a wind turbine 100 is described below with reference to FIG. 2. The method 200 comprises a step 210 of taking into account the effects of a reduction in rotor thrust on the tower loads, and based thereon a step 220 of reducing the rotor thrust.

The method is based essentially on the knowledge that a reduction in rotor thrust, as usually implemented under certain conditions in controllers of wind turbines, may in some situations be either counter-productive or unnecessary. Irrespective of the rotation speed control, there are environmental states or states of the wind turbine in which it is useful to reduce the rotor thrust, for example by rapidly feathering the rotor blades 108, i.e., increasing the pitch angle of the rotor blades 108 greatly or rapidly. This is the case for example if the mechanical strain on the wind turbine, i.e., the load, is to be reduced or an overload must be prevented. Possible implementations for reducing the rotor thrust comprise increasing a minimum blade angle for one or more of the rotor blades, or also reducing the nominal rotation speed of the wind turbine. This leads to an abrupt reduction in rotor thrust, which is not always desirable. The present disclosure serves to attenuate or suppress the reduction in rotor thrust which may perhaps be requested by other protective functions, i.e., so as not to exceed a level which is healthy for all components of the wind turbine.

If for example the rotor blades are rapidly feathered, i.e., the pitch angle of the rotor blades is rapidly increased, and the tower 102 is simultaneously oscillating forward, i.e., substantially into wind, the reduction in thrust of the rotor 106 would lead to the tower 102 oscillating even faster and above all further forward. Here, extreme loads on the tower 102 may occur. In another situation, the rotor blades 108 are however also feathered rapidly in order to protect the tower 102 itself from overload. Here it should be avoided that, because of the thrust of the rotor 106, the tower 102 is pressed too far back, i.e., in the direction of the wind. The risk of overload on the tower 102 does not however exist if the tower 102 is presently oscillating forward, i.e., into wind. If in this case the rotor thrust of the rotor 106 were reduced, an unnecessary yield loss would occur.

For this reason, firstly in step 210 it is checked whether the effect of reducing the rotor thrust is sensible and necessary. Only in this case does the method 200, in the step 220, actually reduce the rotor thrust, e.g., by increasing the minimum pitch angle of the rotor blades 108 or by reducing the nominal rotation speed. Other possibilities for reducing the rotor thrust are naturally possible.

In this example, the consideration in step 210 is implemented in that a suitable control unit of the wind turbine preferably checks that the reduction in thrust of the rotor 106 is neither counter-productive nor unnecessary. For this, the acceleration sensors 112 are used, by means of which in this example the speed of the tower head or nacelle 104 is calculated or estimated. The speed may be determined in this example via the measured acceleration of the tower head. As an alternative to the determination by means of the acceleration sensor 112, load measurement may be used for calculating the tower head speed. In further examples, a change in the determined load itself may be used to assess the effect of reducing the rotor thrust.

In the simplest example, threshold values are used such as for the tower head speed, nacelle oscillation speed or the change in loads, in order to assess whether or not the rotor thrust should be reduced. In this case, the rotor thrust would only be reduced if the threshold values are reached. In alternative embodiments however, a maximum value for pitch speed may be formed, or alternatively all other controls for reducing the rotor thrust, as a function of parameters indicative of the effect, e.g., the tower head speed, nacelle oscillation speed or also the load change rate.

Derivatives and combinations of threshold values and complex functions, for example staggered threshold values, are also conceivable. Similarly, more than one input variable may be used, for example several measured or estimated speeds.

The invention claimed is:

1. A method comprising:
   operating a wind turbine, wherein the wind turbine has a tower, wherein tower loads act on the tower, the wind turbine having an aerodynamic rotor configured to generate a rotor thrust,
   determining whether a reduction of the rotor thrust would reduce the tower loads, and
   in response to determining that the reduction of the rotor thrust would reduce the tower loads, reducing the rotor thrust.

2. The method as claimed in claim 1, wherein determining reduction of the rotor thrust would reduce the tower loads comprises suppressing or attenuating the reduction of the rotor thrust when the reduction of rotor thrust leads to an increase in tower loads.

3. The method as claimed in claim 1, wherein determining the reduction of the rotor thrust would reduce the tower loads comprises suppressing or attenuating the reduction of rotor thrust when the reduction of rotor thrust leads to an unnecessary reduction in loads acting on the tower.

4. The method as claimed in claim 1, further comprising determining the tower loads, wherein determining the reduction of the rotor thrust would reduce the tower loads comprises comparing a change in tower loads with a threshold value.

5. The method as claimed in claim 1, wherein determining the reducing the rotor thrust on the tower loads comprises determining a tower head speed or a nacelle oscillation speed.

6. The method as claimed in claim 5, wherein at least one of the tower head speed or the nacelle oscillation speed is determined from an acceleration of the tower head or nacelle of the wind turbine.

7. The method as claimed in claim 5, wherein reducing the rotor thrust is suppressed as long as the tower head speed in the wind direction lies below a predefined threshold value.

8. The method as claimed in claim 1, wherein reducing the rotor thrust comprises increasing a pitch angle of at least one rotor blade of the aerodynamic rotor.

9. The method as claimed in claim 8, wherein reducing the rotor thrust comprises an increase in a minimum pitch angle.

10. The method as claimed in claim 1, wherein reducing rotor thrust comprises a lowering of the nominal rotation speed.

11. The method as claimed in claim 1, wherein reducing the rotor thrust is performed while further considering the effect of the reduction of rotor thrust on the tower loads in that a maximum permitted change of pitch angle of at least one rotor blade of the aerodynamic rotor is implemented as a complex function of the tower loads.

12. The method as claimed in claim 11, wherein the complex function of the tower loads is a function of a tower head speed.

13. A wind turbine, comprising:
a tower, wherein tower loads act on the tower,
an aerodynamic rotor configured to generate a rotor thrust, and a controller, wherein the wind turbine is configured to:
operate the wind turbine,
receive signals indicative of the rotor thrust,
determine whether a reduction of the rotor thrust would reduce the tower loads, and
in response to determining that the reduction of the rotor thrust would reduce the tower loads, reduce the rotor thrust.

14. A wind park with a plurality of wind turbines as claimed in claim 13.

* * * * *